(12) United States Patent  
Foti (10) Patent No.: US 9,113,283 B2
(45) Date of Patent: Aug. 18, 2015

(54) SYSTEMS AND METHODS FOR EVENT NOTIFICATION FRAMEWORK IN A MACHINE-TO-MACHINE (M2M) CONTEXT

(75) Inventor: George Foti, Dollard des Ormeaux (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 278 days.

(21) Appl. No.: 13/438,527

(22) Filed: Apr. 3, 2012

(65) Prior Publication Data
US 2013/0262576 A1 Oct. 3, 2013

(51) Int. Cl.
*G06F 15/16* (2006.01)
*H04W 4/00* (2009.01)

(52) U.S. Cl.
CPC .............. *H04W 4/005* (2013.01); *H04W 4/001* (2013.01)

(58) Field of Classification Search
CPC .. H04W 4/005; H04W 8/20; H04L 29/12754; H04L 65/1006; H04L 65/105; H04L 67/104; H04L 12/2809; H04L 12/2803; H04L 51/24; H04L 67/18
USPC ........................................................ 709/204
See application file for complete search history.

(56) References Cited

U.S. PATENT DOCUMENTS

| 2003/0100326 | A1* | 5/2003 | Grube et al. ................... 455/515 |
| 2005/0209990 | A1* | 9/2005 | Ordille et al. ...................... 707/1 |
| 2008/0163318 | A1* | 7/2008 | Chen et al. ...................... 725/109 |
| 2010/0142447 | A1 | 6/2010 | Schlicht et al. |
| 2010/0250677 | A1* | 9/2010 | Kahan et al. .................... 709/204 |
| 2010/0317322 | A1* | 12/2010 | Underwood et al. .......... 455/410 |
| 2012/0221723 | A1* | 8/2012 | Cutler et al. .................... 709/225 |
| 2013/0042011 | A1 | 2/2013 | Sugizaki et al. |

FOREIGN PATENT DOCUMENTS

| WO | 2008/102265 | A2 | 8/2008 |
| WO | 2011/109424 | A1 | 9/2011 |
| WO | 2012/069997 | A1 | 5/2012 |

OTHER PUBLICATIONS

Draft ETSI TR 101 531 V<0.3.0>, Machine-to-Machine communications (M2M); Reuse of Core network functionality by M2M Service Capabilities; Nov. 2011, pp. 1-191.
International Search Report from corresponding application PCT/IB2013/052667.

* cited by examiner

*Primary Examiner* — Kevin Bates
*Assistant Examiner* — Sm Rahman
(74) *Attorney, Agent, or Firm* — Francois Cartier; Ericsson Canada Inc.

(57) ABSTRACT

Systems and methods provide for managing subscriptions to changes in resources in a Machine-to-Machine (M2M) system at a communications node. A method for such includes receiving, at an interface, a first subscription request from a first user to an application event; determining, by a processor, if other devices are subscribed to the application event; reading, by the communications node, the first subscription request including data, semantics and syntax; storing, in a memory, binding information for the first user and the application event; and transmitting, by the interface, if, based on said step of determining, no other devices are subscribed to the application event a second subscription message toward an M2M application server (AS).

25 Claims, 6 Drawing Sheets

SYSTEMS AND METHODS FOR EVENT NOTIFICATION FRAMEWORK IN A MACHINE-TO-MACHINE (M2M) CONTEXT

TECHNICAL FIELD

The embodiments of the subject matter disclosed herein generally relate to communication systems and more particularly relate to subscription control in Machine-to-Machine (M2M) systems.

BACKGROUND

During the past years, the interest in using mobile and landline/wireline computing devices in day-to-day communications has increased. Desktop computers, workstations, and other wireline computers currently allow users to communicate, for example, via e-mail, video conferencing, and instant messaging (IM). Mobile devices, for example, mobile telephones, handheld computers, personal digital assistants (PDAs), etc., also allow users to communicate via e-mail, video conferencing, IM, and the like. Mobile telephones have conventionally served as voice communication devices, but through technological advancements they have recently proved to be effective devices for communicating data, graphics, etc. Wireless and landline technologies continue to merge into a more unified communication system, as user demand for seamless communications across different platforms increases, which in turn creates more usage, and leads to more services and system improvements.

Another area which has benefited from the technologies associated with the advances in communications technology is Machine-to-Machine (M2M) systems. Early M2M systems typically were private systems which allowed for communication between a sensor and a device, wherein information associated with the sensor, e.g., current fluctuation, water flow, temperature, etc., could be transmitted back to a device which could use that information or allow an operator to use the information.

More recent M2M systems are more public systems which can allow a plurality of sensors, devices, software applications and user terminals to share information. M2M systems can also allow any application to subscribe to any change to any M2M resource held in an M2M Service Capability Platform. For example, an M2M system could be designed wherein a sensor is placed at every utility meter enabling M2M applications to subscribe to fluctuations in energy usage by thousands or millions of energy consumers, or to be notified when battery levels in these remote devices fall below a certain range. With these options, as M2M systems grow, the volume of transmitted information in M2M systems is expected to become quite large.

Currently, the European Telecommunications Standards Institute (ETSI) M2M framework does not provide support for application related events. Application related events are typically events related to M2M applications which are using the M2M system to manage M2M resources that are of interest to the M2M applications. To report an event when the water meter consumption exceeds a certain level for a user, or when a machine measuring a diabetic level for a patient goes under or over a certain level are examples of application related events in the context of the M2M system. There are potentially a large number of these application related events which are use cases that constitute value added information for an end user which can be revenue generating services for potential M2M service and application providers.

The current ETSI M2M framework is transparent to the information exchanged by applications and acts like a system which can store and forward information without knowing the content of the information, e.g., the syntax and/or the semantics of the data are not understood by the system.

Accordingly, systems and methods for support of application related events in M2M systems are desirable as they represent value-added services to M2M systems.

SUMMARY

Exemplary embodiments describe subscription control procedures for Machine-to-Machine (M2M) communication networks. By using the exemplary subscription management embodiments and the associated signaling described herein, network congestion can be reduced and subscriptions to application events can be more efficiently managed as the M2M communication networks grow in volume. It will be appreciated by those skilled in the art, however, that the invention is not limited to those embodiments which produce any or all of these advantages or benefits and that other advantages and benefits may be realized depending upon the particular implementation.

According to an exemplary embodiment there is a method for managing subscriptions to changes in resources in a Machine-to-Machine (M2M) system at a communications node. The method includes: receiving, at an interface, a first subscription request from a first user to an application event; determining, by a processor, if other devices are subscribed to the application event; reading, by the communications node, the first subscription request including data, semantics and syntax; storing, in a memory, binding information for the first user and the application event; and transmitting, by the interface, if, based on said step of determining, no other devices are subscribed to the application event a second subscription message toward an M2M application server (AS).

According to another exemplary embodiment there is a communications node for managing subscriptions to changes in resources in a Machine-to-Machine (M2M) system. The communications node includes: an interface configured to receive a first subscription request from a first user to an application event; a processor configured to determine if other devices are subscribed to the application event; the communications node configured to read the first subscription message request including data, semantics and syntax; a memory configured to store binding information for the first user and the application event; and the interface configured to transmit if, based on said step of determining, no other devices are subscribed to the application event a second subscription message toward an M2M application server (AS).

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to exemplary embodiments, subscriptions to resources can be managed in an M2M system to reduce congestion and improve communications efficiency. An exemplary M2M architecture 2 in which the various exemplary embodiments described herein can be implemented is now described with respect to FIG. 1. M2M architecture 2 includes a plurality of M2M devices (M2M D1) 4 which communicate with a gateway (GW) 6 which communicates with the M2M Service Capability Platform (SCP) 10. The GW 6 can communicate with an M2M SCP 10 over an mId reference point 8. Note that M2M D1 4 devices are labeled as hidden devices since they connect to the network via the GW 6. M2M devices, e.g., M2M D2 44 can also connect to the network directly through the mId interface 8.

Figure 1:
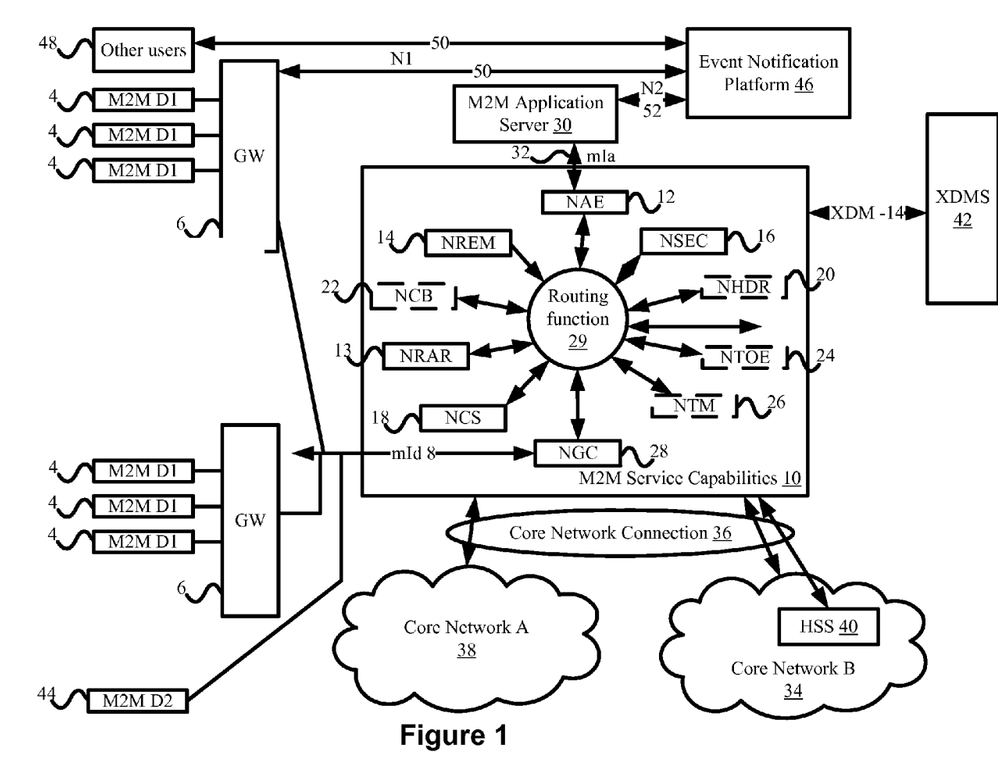
FIG. 1 depicts a Machine-to-Machine (M2M) architecture according to an exemplary embodiment.

Examples of the various internal functions within the M2M SCP 10 can include a Network Application Enablement (NAE) capability 12, a Network Reachability Addressing and Repository Capability (NRAR) 13, a Network Remote Entity Management (NREM) capability 14, a Network Security (NSEC) capability 16, a Network Communication Selection (NCS) capability 18, a Network History and Data Retention (NHDR) capability 20, a Network Compensation Brokerage (NCB) capability 22, a Network Telco Operator Exposure (NTOE) capability 24, a Network Transaction Management (NTM) capability 26, a Network Generic Communication (NGC) capability 28 and a routing function 29. As shown in FIG. 1, some of these service capabilities are shown in a solid line box generally indicating required capabilities and some of the service capabilities are shown in a dashed line box generally indicating optional service capabilities. More or fewer service capabilities could be used.

The NAE capability 12 can act as the contact point to M2M Applications 30 in the network and applications domain over the mIa reference point 32. The NAE capability 12 can also perform authorization and authentication of M2M applications. The NRAR 13 can provide mapping between one or more M2M devices 4 the GW 6 and a set of information which can include a routing address for the M2M devices 4 via GW 6. The NREM 14 provides configuration management functions and can perform software and firmware upgrades for M2M devices and/or M2M gateways. The NSEC capability 16 can provide authentication and service key management functions for applications resident in the GW 6 or M2M devices 4 after successful authentication and registration. The NCS capability 18 can provide both a network selection function and a communication service selection function for M2M devices 5, M2M devices 4 and the GW 6 when applicable and desired. The NHDR capability 20 can be used to archive information as desired. The NCB capability 22 can be used to provide settlement between vendors and customers when compensation, e.g., money or the equivalent, is desired. The NTOE capability 24 can map an operator's non-M2M services, e.g., Telco services, into M2M resources for use by various M2M service capabilities and applications. The NTM capability 26 can perform the management of transactions for the NAE capability 12. The NGC capability 28 can provide transport session and teardown as well as providing encryption on communications with M2M devices 4 via GWs 6. A routing function 29 can provide routing and communications between service capabilities on or associated with the M2M SCP 10. For more information regarding the capabilities of the M2M SCP, the interested reader is pointed to the standards document ETSI TS 102 690 which is incorporated herein by reference.

The M2M SCP 10 can be a platform which can include some or all of the exemplary capabilities described above. The M2M SCP 10 can be considered to have an entry point and the ability to proxy an incoming request to the desired internal function. The M2M SCP 10 additionally can be in communication with one or more core networks, e.g., Core Network A 38 and Core Network B 34, over a Core Network Connection 36 or other communication link(s) as desired. The M2M SCP 10 also can communicate with a Home Subscriber Service (HSS) 40 which contains subscription related information and can perform authentication/authorization functions for the Core Network B 34. An eXtensible Markup Language (XML) database management server (XDMS) 42 can also communicate with the M2M SCP 10 as shown in FIG. 1. Note that the XDMS 42 can be used as a database for storing M2M resources that are held in the M2M system. Alternatively, any other database could work as well.

According to exemplary embodiments, the exemplary M2M architecture 2 also includes an Event Notification Platform 46. The Event Notification Platform 46 according to this embodiment includes two interfaces N1 50 and N2 52. The N1 interface 50 allows for communications between gateways 6, devices, other devices 48 and the Event Notification Platform 46. The N2 interface 52 allows for communication between each M2M AS 30 and the Event Notification Platform 46. The Event Notification Platform 46 maintains a binding between each M2M AS 30 and a list of events supported by the M2M AS 30 to which subscription requests can be targeted. A further discussion of the Event Notification Platform 46 is provided below.

Prior to describing exemplary embodiments for reducing signaling using the exemplary architecture shown in FIG. 1, a current method for signaling will now be described with respect to the signaling diagram shown in FIGS. 2 and 3. The signaling diagram shown in FIGS. 2 and 3 can be supported by a conventional M2M architecture which includes some of the structural elements shown in FIG. 1, e.g., the Event Notification Platform 46 is not currently part of the conventional M2M architecture, and as such similar reference numbers are used for the same nodes.

Figure 2:
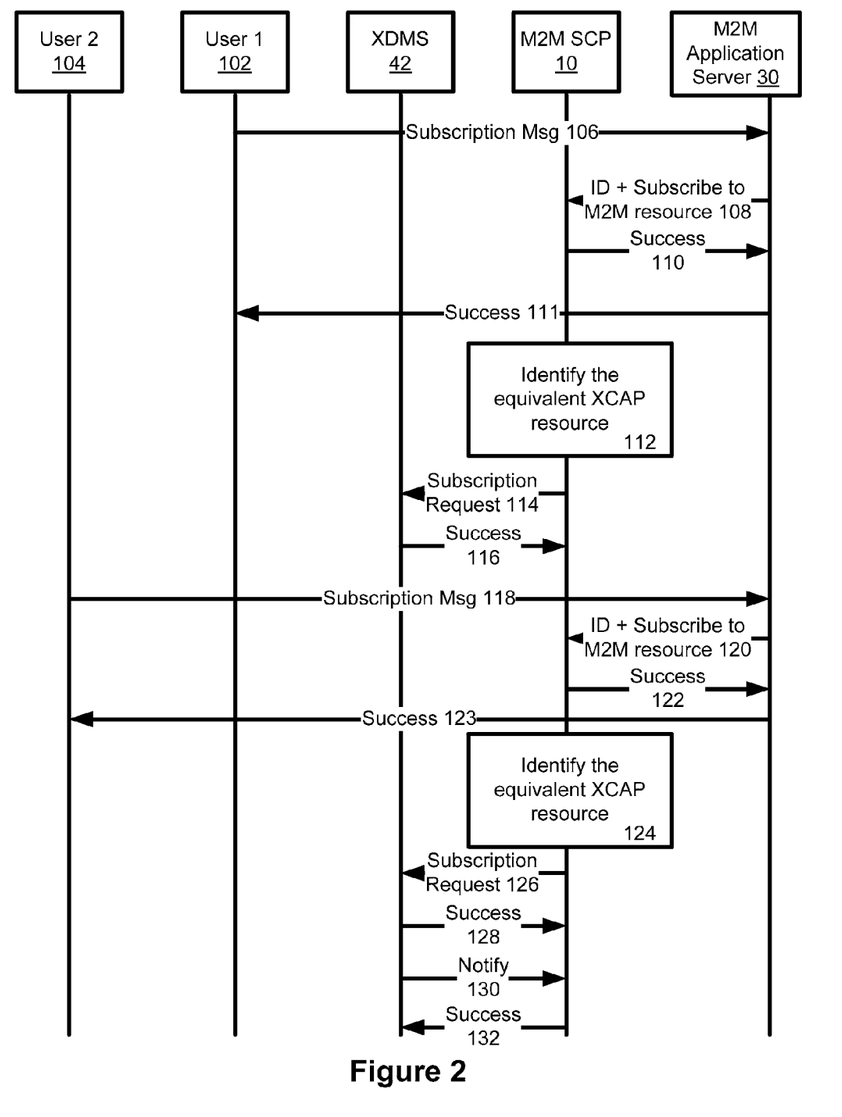
FIGS. 2 and 3 illustrate conventional signaling associated with subscription to an application event.
Figure 3:
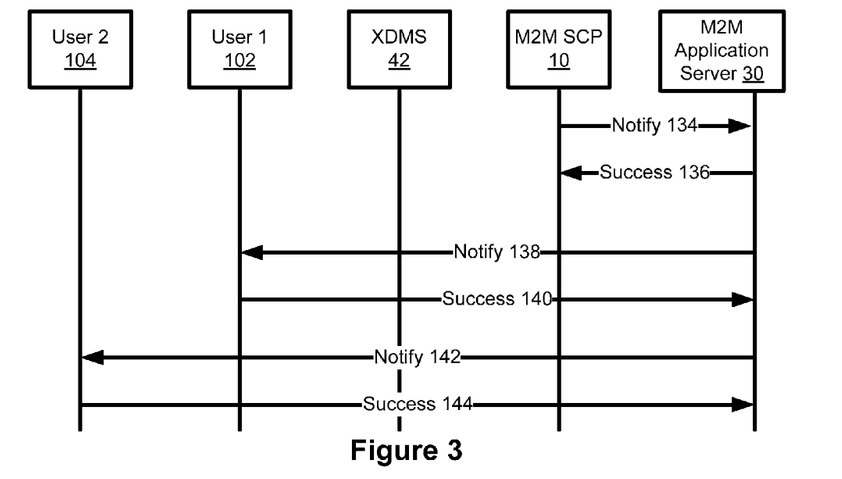

When one or more users desire to subscribe to an application event, e.g., when a battery level in a device goes below 2 volts, using a conventional M2M architecture a series of messages are transmitted as shown in FIGS. 2 and 3. Initially, a subscription message 106 is transmitted from User1 102 to the M2M AS 30. Upon receipt of the subscription message 106 the M2M AS 30 transmits a message 108 for identifying and subscribing to the M2M resource associated with the subscription message 106 to the M2M SCP 10. The M2M SCP 10 responds to the M2M AS 30 with a Success message 110. The M2M AS 30 then can transmit a Success message 111 back to User1 102. The M2M SCP 10 then identifies the equivalent XML Configuration Access Protocol (XCAP) resource as shown in block 112. The M2M SCP 10 then transmits a Subscription request message 114 to the XDMS 42. The XDMS 42 then responds with a Success message 116 to the M2M SCP 10. Another user, e.g., User2 104, decides to subscribe to the same application event and a similar series of messages are transmitted as shown by messages 118-128.

When a change occurs to the application event, a Notify message 130 is sent from the XDMS 42 to the M2M SCP 10. The M2M SCP 10 responds by transmitting a Success message 132 back to the XDMS 42. The M2M SCP 10 then transmits/forwards a Notify message 134 to the M2M AS 30 which responds to the M2M AS 30 with a Success message 136. The M2M AS 30 then transmits/forwards a Notify message 138 to User1 102 and Notify message 142 to User2 104. These notification messages 138 and 142 were initiated by the first Notify message 130 from the XDMS 42. User1 102 and User2 104 respond with Success messages 140 and 144, respectively.

Figure 4:
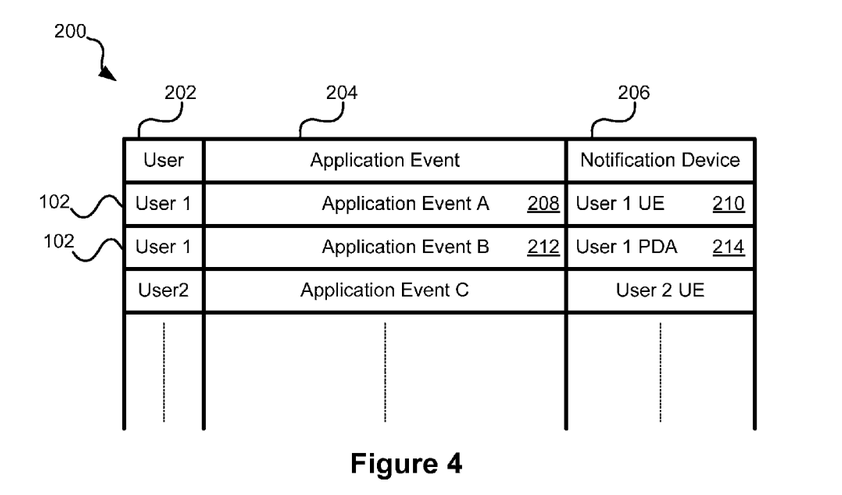
FIG. 4 depicts a binding table according to an exemplary embodiment.

According to an exemplary embodiment, as described above, the Event Notification Platform 46 can be used in support of more efficient signaling associated with application events. More specifically, the number of subscription and notification messages transmitted can be reduced. The Event Notification Platform 46 can maintain a binding between a specific subscription request to an application event and the users subscribed to that application event. These bindings can be stored, for example, in a table format in memory. An example of a binding table is shown in FIG. 4. The binding table 200 includes a column for the user 202 a column for the application event 204 and a column for the notification device 206, i.e., the device which is to receive information associated with a change to an application event. For example, the binding table 200 currently has multiple stored entries. One entry shows User1 102 associated with Application Event A 208 and with the notification device being User1's user equipment (UE) 210. Another entry shows User1 102 associated with Application Event B 212 with the notification device being User7's personal digital assistant (PDA) 214. Having this information allows the Event Notification Platform 46 to forward an incoming subscription request to the correct M2M AS 30 only once for each application event instead of for each subscription request received. This also allows, when receiving a single notification from the M2M AS 30 regarding an application event, the Event Notification Platform 46 to send a notification to each subscriber.

According to an exemplary embodiment, the Event Notification Platform 46 is capable of understanding the contents of the incoming subscription requests. The contents can include data, syntax, semantics and anything else contained in the subscription requests. The Event Notification Platform 46 reads this information to determine if all of the information is both present and accurate. This further allows the Event Notification Platform 46 to reject received subscription requests as needed and in turn spares resources of the M2M AS 30 from having to perform this function. In support of this, the Event Notification Platform 46 can have the XML for the subscriptions stored at its location. Another function that the Event Notification Platform 46 can include, is the ability to perform the duties of a security gateway, e.g., stopping denial of service attacks.

According to an exemplary embodiment, in order for each M2M AS 30 to be able to support an application event, the M2M AS 30 should be informed of any changes in the resource corresponding to the requested event so that the M2M AS 30 can evaluate if there is a need to generate a notification. For example, if there is a need to report on an application event when a battery level for a device goes below two volts, all changes to readings of the battery level would need to be evaluated by the M2M AS 30 so that a notification can be generated when the battery level falls below two volts by the M2M AS 30 to the Event Notification Platform 46. For another use example, consider when a heart patient wants a relative to be notified when his heart beat falls below a certain value so the relative can call to ask him about the reading. For this example, all changes to the readings from the heart monitoring equipment would need to be evaluated by the M2M AS 30, and if required a notification message is sent to the Event Notification Platform 46 for forwarding to the appropriate user. These readings from M2M devices can be stored in the M2M framework, e.g., the XDMS 42 or another database, which the M2M AS 30 subscribes to. This allows the M2M AS 30 to be notified of only changes to application event and to not need the M2M AS 30 to receive all readings generated by the M2M devices.

Figure 5:
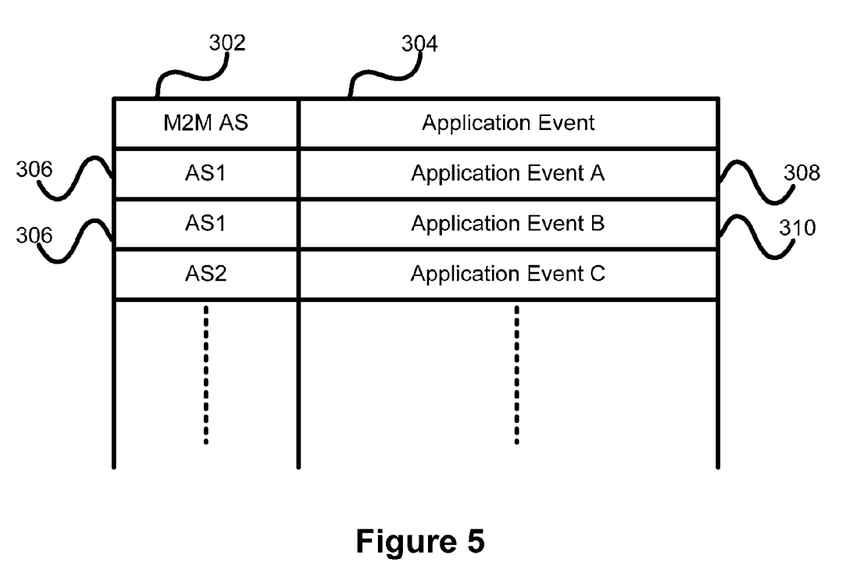
FIG. 5 illustrates a table associating application servers and application events according to an exemplary embodiment.

According to an exemplary embodiment, the Event Notification Platform 46 can also store in memory information which associates which M2M AS 30 is associated with which application event or events. In one embodiment, this information can be stored in a table as shown in FIG. 5. Table 300 includes a column for the M2M AS 302 and a second column for the application event 304. For example, as shown in FIG. 5, AS1 306 is associated with both Application Event A 308 and Application Event B 310.

According to an exemplary embodiment, the entity requesting the subscription can be the same entity which receives the notification. Alternatively, another entity could be specified to receive the notification of the application event. Additionally, the form of notification can be diverse. Some purely illustrative examples of notification methods can include email, recorded message, plain text, or text message on a cell phone and the like. However, other notification methods can also be used.

Figure 6:
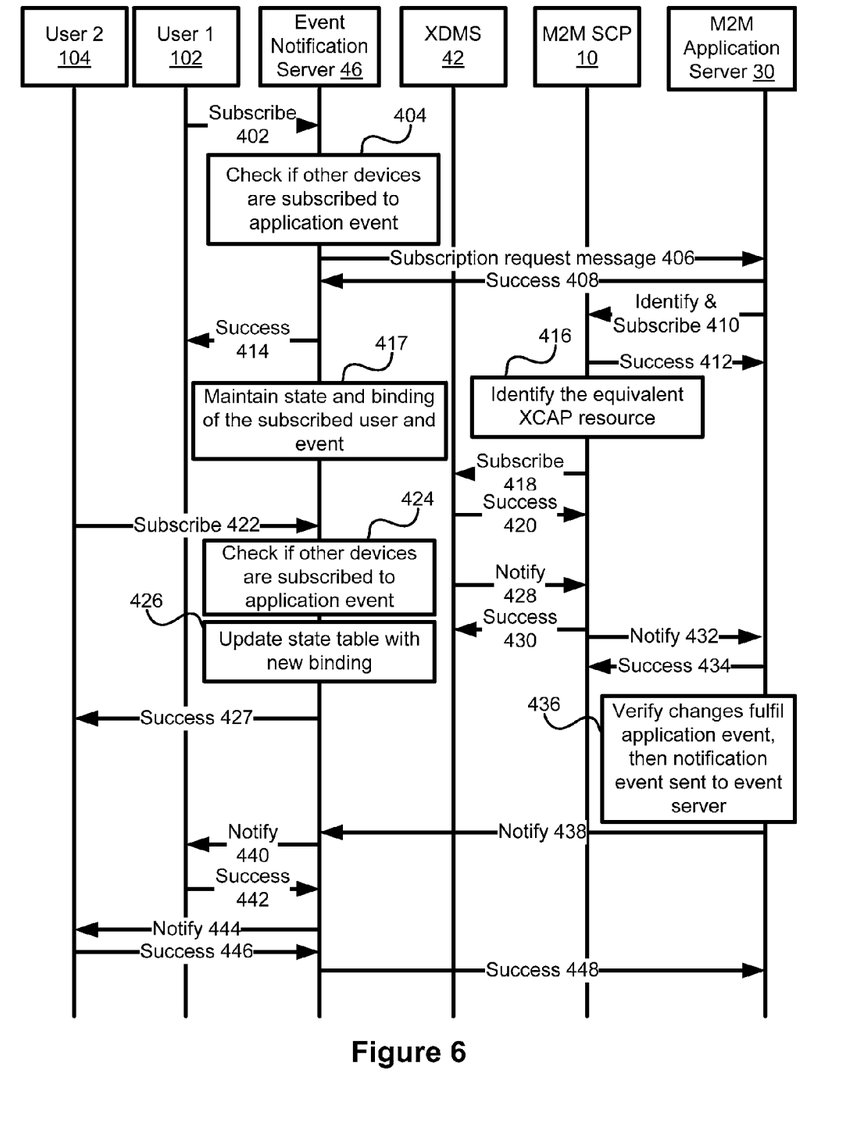
FIG. 6 shows exemplary signaling associated with subscription to an application event according to an exemplary embodiment.

According to exemplary embodiments, by using the Event Notification Platform 46 (or other node which performs the same functions), the amount of signaling that typically occurs during subscription to and notification of applicant events can be reduced. For example, the Event Notification Platform 46 can receive subscription requests for application events from multiple users, and then transmit a single subscription request to the M2M AS 30. Additionally, the Event Notification Platform 46 can receive a single notification message and forward multiple notification messages to a plurality of subscribed user. Signaling, according to an exemplary embodiment, is shown in FIG. 6 and will now be described.

Initially, User1 102 sends a subscription request message 402 for a specific application event to the Event Notification Platform 46. The Event Notification Platform 46 can first determine if there is an existing subscription stored in a binding table (or other desired format in a memory) for such an application event as shown by block 404. If there was a pre-existing subscription, the Event Notification Platform 46 would update its binding table with the new information. However, in this case, this is the first subscription received for this application event. The Event Notification Platform 46 then searches its memory for which M2M AS 30 is associated with the request application event. Therefore, the Event Notification Platform 46 needs to and does subscribe to the M2M AS 30 as shown by subscription request message 406 to the M2M AS 30. After the M2M AS 30 receives the subscription request message 406, the M2M AS 30 replies to the Event Notification Platform 46 with a Success message 408. Upon receipt of the Success message 408 the Event Notification Platform 46 then transmits a Success message 414 to User1 102. Additionally, the Event Notification Platform 46 maintains a binding between the user requesting the application event and the application event in memory as shown in box 417.

Returning to the M2M AS 30, after transmitting the Success message 408 to the Event Notification Platform 46, the M2M AS 30 identifies the M2M resource for the requested application event and then subscribes to the M2M SCP 10, as shown by message 410, to the M2M resource that corresponds to the requested application event. The M2M SCP 10 replies to the subscription message 410 with a Success message 412. The M2M SCP 10 can then locate the XCAP resource which corresponds to the M2M resource and then subscribe to the XDMS 42 as shown by subscription request message 418. The XDMS 42 then responds with Success message 420. According to an exemplary embodiment, any database can be used instead of XDMS 42 for storing M2M resources and as such the appropriate signaling that is appropriate in such a case will be used. According to an exemplary embodiment, this process allows for the M2M SCP 10 and the M2M AS 30 to be notified when any changes to the requested resource occurs.

Continuing with this example, User2 104 sends a subscription request message 422 for the same application event that User1 102 subscribed to, to the Event Notification Platform 46. Upon receipt of the subscription request message 422, the Event Notification Platform 46, as shown in blocks 424 and 426, determines if there is an existing subscription for the application event. In this example, there is an existing subscription for this application event, e.g., the subscription request from User1 102. As such the Event Notification Platform 46 does not issue any further subscription requests to the M2M AS 30 for the recently received subscription request. The Event Notification Platform 46 updates its binding table with a new binding associating User2 104 and the application event. User 2 is then provided an indication that the subscription was successful in message 427.

At some point in time after User2 104 has subscribed to the Notification Event Server 46 (purely for example purposes) the XDMS 42 transmits a NOTIFY message 428 to the M2M Platform 46 to report a change in the subscribed resource. Upon receipt of the NOTIFY message 428, the M2M SCP 10 replies with Success message 430. The M2M SCP 10 will also transmit NOTIFY message 432 to the M2M AS 30. The M2M AS 30 replies to the M2M SCP 10 with Success message 434. The M2M AS 30 can then review the received data from the NOTIFY message 432 to determine if there is a requested application event from any user or applications. The M2M AS 30 then determines, as shown in block 436, if any notifications need to be generated based upon the change to the application event. In this example, the M2M AS 30 determined that a user was subscribed to the application event by searching its memory and that the change was significant enough to warrant a notification being transmitted.

The M2M AS 30 then transmits a notification message 438 associated with the application event to the Event Notification Platform 46. The Event Notification Platform 46 then searches its binding table for the users associated with the received change to the application event and transmits the change to the users in notification messages. The messages for both notification and the associated replies are shown by messages 440-446. Upon completion of the notification process, the Event Notification Platform 46 transmits a Success message 448 to the M2M AS 30. While this example shows two users subscribing to a same single application event, other combinations can occur. For example, hundreds, thousands or more users could be subscribed to one or more different application events. Using the methods and systems described herein, the amount of signaling in the system can be reduced which makes the system more efficient while also reducing cost as compared to convention M2M systems.

While the exemplary embodiments described above have shown subscription requests to application events be generated by outside sources, e.g., User1 102 and User2 104, internally generated subscriptions to application events can also be generated. Internally generated subscription requests can come, for example, from the operator of the M2M AS 30. Internally generated subscription requests that are transmitted to the Event Notification Platform 46 can be processed as any other type of received subscription request.

Figure 7:
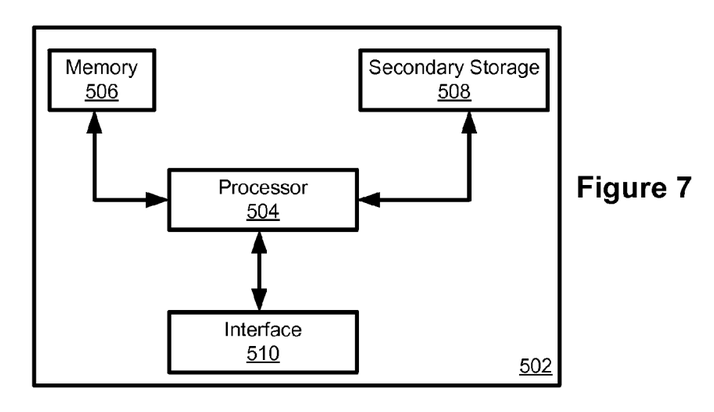
FIG. 7 illustrates a communications node according to an exemplary embodiment.

The exemplary embodiments described above provide for managing subscriptions and signaling in an M2M communications system 2. Exemplary communications node 502, e.g., the Event Notification Platform 46, which can perform subscription management and above described signaling, will now be described with respect to FIG. 7. The communications node 502 can contain a processor 504 (or multiple processor cores), memory 506 which can include one or more tables, one or more secondary storage devices 508 and an interface unit 510 to facilitate communications between the communications node 502 and other nodes/devices that communicate within and to the M2M communications system 2. The processor 504 can execute algorithms, other instructions and make the associated determinations to facilitate the exemplary embodiments described above with respect to subscription management as it applies to application events as described herein. Memory 506 can be used to store information including the binding information between users and application events as well as a list of all application events which each M2M AS 30 are associated with, i.e., the Event Notification Platform 46 stores information so that it knows which M2M AS 30 to subscribe to for each application event. Thus, communications node 502 can perform the functions of the Event Notification Platform 46 as desired.

Figure 8:
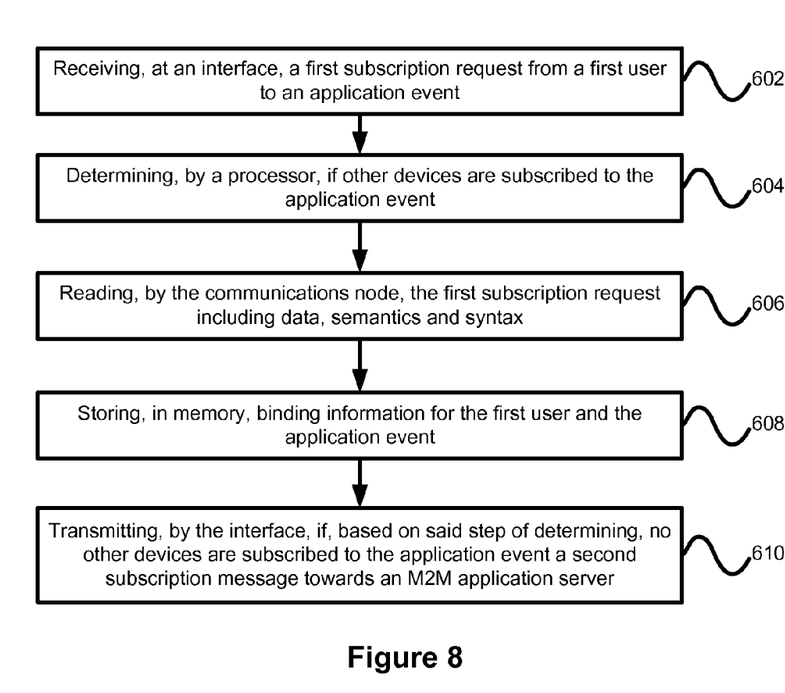
FIG. 8 shows a method flowchart according to an exemplary embodiment.

An exemplary method for managing subscriptions to changes in resources in an M2M system at a communications node is illustrated in FIG. 8. Therein, at step 602, receiving, at an interface, a first subscription request from a first user to an application event; at step 604 determining, by a processor, if other devices are subscribed to the application event; at step 606 reading, by the communications node, the first subscription request including data, semantics and syntax; at step 608 storing, in a memory, binding information for the first user and the application event; and at step 610 transmitting, by the interface, if, based on said step of determining, no other devices are subscribed to the application event a second subscription message toward an M2M application server (AS). The AS in turn can subscribe, if need be, for the requested information with the actual M2M system using standardized interfaces for that purpose.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A system for managing subscriptions to changes in resources in a Machine-to-Machine (M2M) system, wherein the resources are associated with M2M devices, the system comprising:
    an event notification platform configured to receive subscription requests from users to application events in an M2M environment, the event notification platform including:
        an interface;
        a memory configured to store binding information; and
        a processor configured to determine, upon the interface receiving, from a first user, a first subscription request to an application event, if at least one other user is subscribed to the application event, and, as a function of the determination, if no other user is subscribed to the application event, to generate binding information between the first user and the application event, to store the binding information for the first user and the application event in the memory, and to direct the interface to transmit a second subscription message toward an M2M application server (AS), and if at least one other user is subscribed to the application event, to update binding information between the at least one other user and the application event to add the first user, and to refrain from directing the interface to transmit a second subscription message toward the M2M AS;
    the M2M AS configured to receive the second subscription message and notification messages from an M2M service capabilities platform (SCP), configured to subscribe to the M2M SCP, and configured to determine if information in a received first notification message includes a change to the application event in the M2M environment which triggers transmitting a second notification message toward the event notification platform; and
    an M2M SCP configured to identify an equivalent extensible markup language (XML) configuration access protocol (XCAP) resource associated with an M2M device based on a received third subscription message from the M2M AS.

2. A method for managing subscriptions to changes in resources in a Machine-to-Machine (M2M) system at a communications node, the method comprising:
    receiving, from a first user, a first subscription request to an application event;
    determining if at least one other user is subscribed to the application event; and
    as a function of the determination, if no other user is subscribed to the application event, generating binding information between the first user and the application event, storing the binding information for the first user and the application event, and transmitting a second subscription request toward an M2M application server (AS), and if at least one other user is subscribed to the application event, updating binding information between the at least one other user and the application event to add the first user, and refraining from transmitting a second subscription request toward the M2M AS.

3. The method of claim 2, wherein the communications node is an event notification platform.

4. The method of claim 2, further comprising:
    receiving, from a second user, a third subscription request to the application event;
    determining, if at least one other user is subscribed to the application event; and
    updating binding information between the at least one other user and the application event to add the second user, and refraining from transmitting a fourth subscription request toward the M2M AS.

5. The method of claim 2, wherein the binding information is stored in a binding table in a memory.

6. The method of claim 2, further comprising:
    receiving a notification message which includes change information associated with the application event;
    determining which users are associated with the application event received in the notification message; and
    transmitting the change information associated with the application event to the users.

7. The method of claim 6, wherein transmitting the change information associated with the application event to the users includes transmitting to an entity which was identified in the first subscription request associated with the application event, wherein the entity is not the user which transmitted the first subscription request.

8. The method of claim 2, wherein the communications node is a stand-alone node.

9. The method of claim 2, wherein the communications node is collocated on a node with at least one other function.

10. The method of claim 2, further comprising:
    storing a list of which application servers support which application events.

11. The method of claim 2, further comprising:
    determining whether to reject said first subscription request upon reading said first subscription request.

12. The method of claim 2, further comprising:
    performing the duties of a security gateway including stopping denial of service attacks.

13. The method of claim 2, wherein communications between the communications node and the first user are over a first communications interface and communications between the communications node and the M2M AS are performed over a second communications interface, wherein the first communications interface and the second communications interface are different.

14. A communications node for managing subscriptions to changes in resources in a Machine-to-Machine (M2M) system, the communications node comprising:
    an interface;
    a memory configured to store binding information;
    a processor configured to determine, upon the interface receiving, from a first user, a first subscription request to an application event, if at least one other user is subscribed to the application event, and, as a function of the determination, if no other user is subscribed to the application event, to generate binding information between the first user and the application event, to store the binding information for the first user and the application event in the memory, and to direct the interface to transmit a second subscription request toward an M2M application server (AS), and if at least one other user is subscribed to the application event, to update binding information between the at least one other user and the application event to add the first user, and to refrain from directing the interface to transmit a second subscription request toward the M2M AS.

15. The communications node of claim 14, wherein the communications node is an event notification platform.

16. The communications node of claim 14, further comprising:
    the interface configured to receive, from a second user, a third subscription request from to the application event;
    the processor configured to determine if at least one other user is subscribed to the application event, to update binding information between the at least one other user and the application event to add the second user, and to refrain from directing the interface to transmit a fourth subscription request toward the M2M AS.

17. The communications node of claim 14, wherein the binding information is stored in a binding table in the memory.

18. The communications node of claim 14, further comprising:
    the interface configured to receive a notification message which includes change information associated with the application event;
    the processor configured to determine which users are associated with the application event received in the notification message; and
    the interface configured to transmit the change information associated with the application event to the users.

19. The communications node of claim 18, wherein transmitting the change information associated with the application event to the users includes transmitting to an entity which was identified in the first subscription request associated with the application event, wherein the entity is not the user which transmitted the first subscription request.

20. The communications node of claim 14, wherein the communications node is a stand-alone node.

21. The communications node of claim 14, wherein the communications node is collocated on a node with at least one other function.

22. The communications node of claim 14, further comprising:
    the memory configured to store a list of which application servers support which application events.

23. The communications node of claim 14, wherein the processor is further configured to determine whether to reject said first subscription request based on reading said first subscription request.

24. The communications node of claim 14, wherein the communications node performs the duties of a security gateway including stopping denial of service attacks.

25. The communications node of claim 14, wherein the interface includes a first communications interface and a second communications interface, wherein communications between the communications node and the first user are over the first communications interface and communications between the communications node and the M2M AS are over the second communications interface, wherein the first communications interface and the second communications interface are different.

* * * * *

UNITED STATES PATENT AND TRADEMARK OFFICE
CERTIFICATE OF CORRECTION

PATENT NO.       : 9,113,283 B2
APPLICATION NO.  : 13/438527
DATED            : August 18, 2015
INVENTOR(S)      : Foti Page 1 of 1

It is certified that error appears in the above-identified patent and that said Letters Patent is hereby corrected as shown below:

In Column 11, Line 11, in Claim 16, delete "request from" and insert -- request --, therefor.

Signed and Sealed this
Nineteenth Day of July, 2016

Michelle K. Lee
*Director of the United States Patent and Trademark Office*